United States Patent
Nolan et al.

(10) Patent No.: US 7,702,182 B2
(45) Date of Patent: Apr. 20, 2010

(54) METHOD AND APPARATUS FOR CREATING A HIGH-FIDELITY GLYPH PROTOTYPE FROM LOW-RESOLUTION GLYPH IMAGES

(75) Inventors: Joseph C. Nolan, Ithaca, NY (US); Robert Filippini, Sunnyvale, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 1080 days.

(21) Appl. No.: 11/355,758

(22) Filed: Feb. 16, 2006

(65) Prior Publication Data

US 2007/0189628 A1 Aug. 16, 2007

(51) Int. Cl.
*G06K 9/40* (2006.01)

(52) U.S. Cl. ............................. 382/284; 382/254

(58) Field of Classification Search ........ 382/254, 382/284
See application file for complete search history.

(56) References Cited

U.S. PATENT DOCUMENTS

| | | | | |
|---|---|---|---|---|
| 4,769,716 | A * | 9/1988 | Casey et al. | 358/445 |
| 5,168,147 | A | 12/1992 | Bloomberg | |
| 5,883,986 | A | 3/1999 | Kopec et al. | |
| 5,956,419 | A * | 9/1999 | Kopec et al. | 382/159 |
| 6,069,978 | A * | 5/2000 | Peairs | 382/254 |
| 7,139,435 | B2 | 11/2006 | Malvar | |
| 7,519,221 | B1 | 4/2009 | Nicholson | |
| 2002/0006220 | A1 * | 1/2002 | Kohchi | 382/165 |
| 2004/0202349 | A1 * | 10/2004 | Erol et al. | 382/100 |
| 2005/0018906 | A1 * | 1/2005 | Napper | 382/186 |
| 2005/0069173 | A1 * | 3/2005 | Morisada et al. | 382/103 |

OTHER PUBLICATIONS

Xu, Yihong et al., "Prototype Extraction and Adaptive OCR", Dec. 1999, IEEE Transactions on Pattern Analysis and Machine Intelligence, vol. 21, No. 12, pp. 1280-1296.*
Kopec et al., Document-Specific Character Template Estimation, 1996, SPIE vol. 2660, pp. 1-13.*
Akimov Alexander and Pasi Franti, "AI and computational logic and analysis (AI): Symbol representation in map compression", Proceedings of the 2004 ACM symposium on applied computing SAC '04, ACM Press.
Kopec, G., "Document-Specific Character Template Estimation," SPIE, 1996, pp. 1-13.
Xu, Y., "Prototype Extraction and Adaptive OCR," IEEE, 1999, pp. 1280-1296.

* cited by examiner

*Primary Examiner*—Aaron W Carter
*Assistant Examiner*—Stephen R Koziol
(74) *Attorney, Agent, or Firm*—Robert C. Kowert; Meyertons, Hood, Kivlin, Kowert & Goetzel, P.C.

(57) ABSTRACT

One embodiment of the present invention provides a system that facilitates creating a high-fidelity glyph prototype from low-resolution glyph images. The system operates by receiving a plurality of glyph images, wherein a glyph image specifies a characteristic shape of a character in a font, and wherein each glyph image in the plurality of glyph images is a separate instance of the same glyph image. Next, the system determines an average blackness for the plurality of glyph images, wherein the blackness of a given glyph image is the number of black pixels in the given glyph image. The system then creates a composite grayscale glyph image from the plurality of glyph images. Finally, the system creates a monochrome glyph image from the composite grayscale glyph image, wherein the monochrome glyph image has the same blackness as the average blackness of the plurality of glyph images.

20 Claims, 7 Drawing Sheets

| CHARACTER 504 | RESULTING MONOCHROME CHARACTER FROM HIGH-RESOLUTION GRID 522 | RESULTING MONOCHROME CHARACTER FROM STANDARD-RESOLUTION GRID 524 |

METHOD AND APPARATUS FOR CREATING A HIGH-FIDELITY GLYPH PROTOTYPE FROM LOW-RESOLUTION GLYPH IMAGES

RELATED APPLICATION

The subject matter of this application is related to the subject matter in a co-pending non-provisional application entitled, "Reconstructing High-Fidelity Electronic Documents Via Generation of Synthetic Fonts," having Ser. No. 11/069,510, and filing date Feb. 28, 2005, which is incorporated herein by reference in its entirety.

BACKGROUND

1. Field of the Invention

The present invention relates to image processing. More specifically, the present invention relates to a method and apparatus for creating a high-fidelity glyph prototype from low-resolution glyph images.

2. Related Art

As businesses and other organizations become progressively more computerized, it is becoming increasingly common to store and maintain electronic versions of paper documents on computer systems. The process of storing a paper document on a computer system typically involves a "document-imaging" process, which converts a copy of the paper document into an electronic document. This document-imaging process typically begins with an imaging step, wherein document page-images are generated using a scanner, a copier, a camera, or any other imaging device. Unfortunately, this document-imaging process can often result in noise being introduced into the image, which can cause an imperfect conversion of the paper document into an electronic document.

One method for reproducing both the logical content and the physical appearance of the source document while reducing the overall file size involves creating "synthetic fonts" to represent characters in the original document. However, the scanned image glyphs are at a lower resolution and poorer quality than the original font glyphs in the source document. Consequently, the synthetic font often does not accurately represent the actual font in the source document. For example, while converting a grayscale synthetic font into a monochrome synthetic font, the resulting monochrome synthetic font is often too light or too dark in comparison to the original font.

Hence, what is needed is a method and an apparatus for producing synthetic fonts without the above-listed problems.

SUMMARY

One embodiment of the present invention provides a system that facilitates creating a high-fidelity glyph prototype from low-resolution glyph images. The system operates by receiving a plurality of glyph images, wherein a glyph image specifies a characteristic shape of a character in a font, and wherein each glyph image in the plurality of glyph images is a separate instance of the same glyph image. Next, the system determines an average blackness for the plurality of glyph images, wherein the blackness of a given glyph image is the number of black pixels in the given glyph image. The system then creates a composite grayscale glyph image from the plurality of glyph images, wherein the composite grayscale glyph image is higher resolution than glyph images in the plurality of glyph images. Finally, the system creates a monochrome glyph image from the composite grayscale glyph image, wherein the monochrome glyph image has the same blackness as the average blackness of the plurality of glyph images.

In a variation on this embodiment, creating the composite grayscale glyph image involves stacking each glyph image in the plurality of glyph images to create a stack of glyph images, and in doing so, using sub-pixel alignment to align each glyph image to glyph images that are already present in the stack of glyph images. The system also overlays the stack of glyph images on an analysis grid. For each pixel in the analysis grid, the system determines an average position blackness for an associated position in the stack of glyph images that is directly above a pixel in the high resolution grid, and assigns the average position blackness to the pixel in the high resolution grid, thereby creating the composite grayscale glyph image.

In a further variation, creating the monochrome glyph image involves determining a blackness threshold for a total blackness of the composite grayscale glyph image. For each pixel on the analysis grid, if the average position blackness is at or above the blackness threshold, the system sets the pixel's value to black, and if the average position blackness is below the blackness threshold, the system sets the pixel's value to white.

In a further variation, prior to determining the blackness threshold, the system increases the resolution of the composite grayscale glyph image. The system then performs a blurring operation on the increased resolution composite grayscale glyph image.

In a further variation, aligning each glyph image involves performing a centroid alignment, wherein the centroid is the center of mass of the glyph image, or performing an offset-centroid alignment, wherein an offset is added to the centroid to determine the alignment of the glyph image.

In a further variation, the analysis grid has a pixel resolution which is greater than each glyph image in the stack of glyph images.

In a variation on this embodiment, the system reduces the resolution of the monochrome glyph image to match the resolution of the plurality of glyph images.

DETAILED DESCRIPTION

Figure 1:
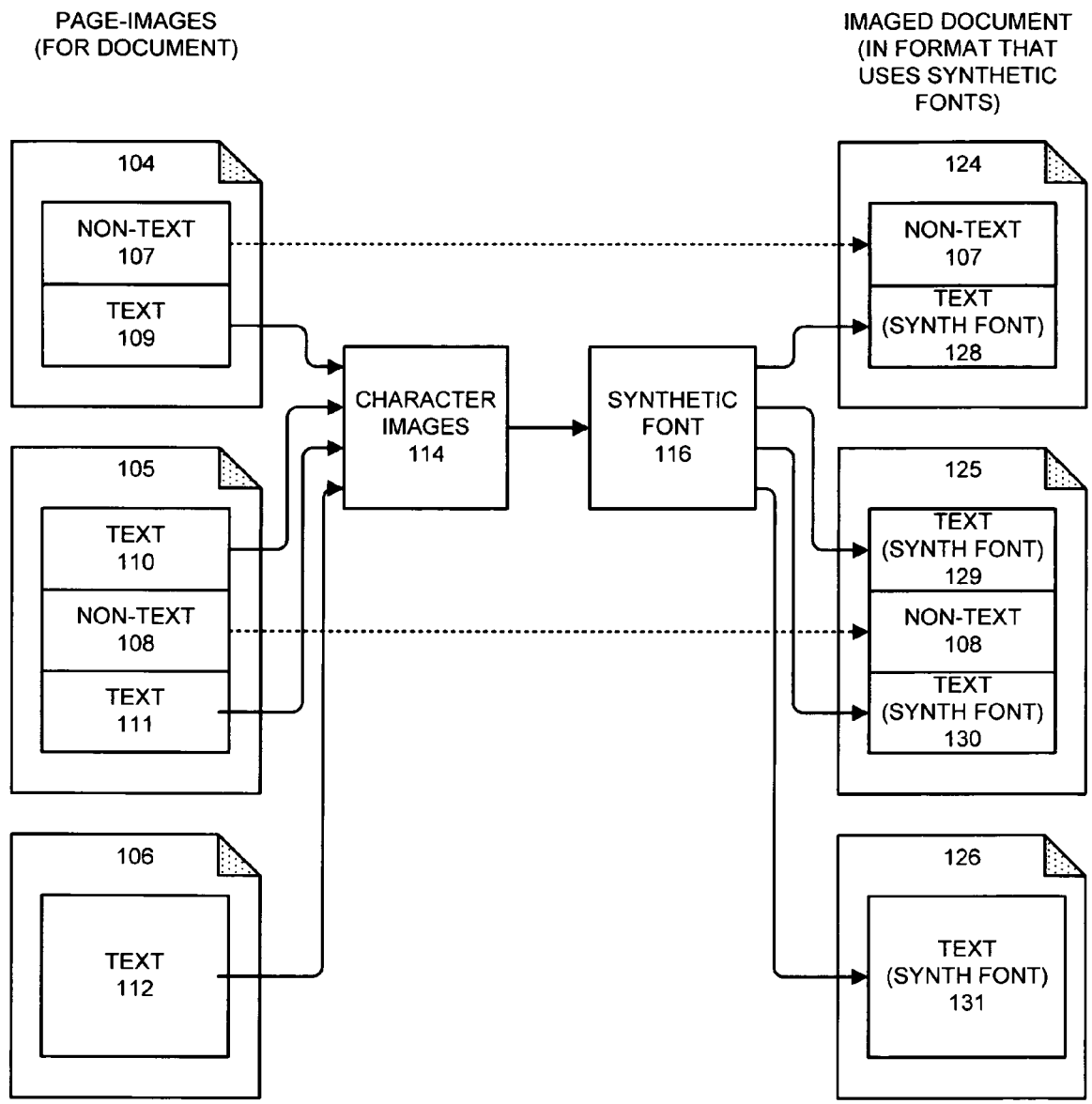
FIG. 1 illustrates a document imaging process in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

One embodiment of the present invention provides a system that facilitates creating a high-fidelity glyph prototype from low-resolution glyph images. Note that a glyph image is an image of a character with a specific shape and formatting. For example, an image of a lower-case character "e" that is 10 point in size, has the Times New Roman font-face, and is not underlined, bold, or italic, is one instance of a glyph. Another image of a lower-case character "e" that is also 10 point in size, also has the Times New Roman font-face, and is also not underlined, bold, or italic, is another instance of the same glyph. On the other hand, an upper-case character "E" that is 10 point in size, has the Times New Roman font-face, and is not underlined, bold, or italic, is an instance of a different glyph.

One embodiment of the present invention facilitates converting a collection of composite grayscale glyphs into a monochrome font. Note that is important to accurately convert the collection of composite grayscale glyphs back to the monochrome font.

The resulting monochrome font, or synthetic font, includes a set of synthesized binary glyphs, each of which represents a set of similar scanned character images. Synthetic fonts are described in detail in U.S. patent application Ser. No. 11/069, 510, entitled, "Reconstructing High-Fidelity Electronic Documents Via Generation of Synthetic Fonts," filed on Feb. 28, 2005.

One embodiment of the present invention describes a method for producing binary glyphs from a composite grayscale character in a manner which preserves the average optical density, or "blackness," of the blobs represented by the binary glyph.

Document Imaging Process

One embodiment of the present invention provides a technique for generating a new universal document imaging format, which provides the combined advantages of current document imaging formats. In particular, the new document format provides the low-production cost and reliable fidelity of image-based formats. At the same time, the new document format provides the small file size, superior display quality, performance, reflowability, and accessibility of formatted-text based formats. Additionally, techniques to generate the new document format facilitate enhanced OCR accuracy, which in turn results in improved searchability.

During the electronic document creation process, character images are extracted from the page-images. (Note that the term "character images" and the process of extracting character images for optical character recognition (OCR) purposes are well-known in the art.) Similar character images are combined to statistically remove noise and other artifacts introduced by the printing and imaging (e.g., scanning) processes. The resulting high-resolution, type-set quality glyphs are then labeled via OCR, and the labeled glyphs are used to construct synthetic document-specific fonts. Finally, the electronic document is constructed by using the synthetic font to duplicate text regions and by using image-segments extracted from the page-images to duplicate non-text regions. The result is a document that is perceptually identical to the original printed document, but is created using a common font mechanism so that the document text is searchable, selectable, reflowable, accessible, etc. This electronic document generally looks better than the scanned images due to statistical removal of noise from the imaged glyphs.

FIG. 1 illustrates this new document imaging process. The system first receives a set of page-images 104-106 for a document, which are illustrated on the left-hand side of FIG. 1. These page-images can contain text regions and non-text regions. More specifically: page-image 104 contains non-text region 107 and text region 109; page-image 105 contains text regions 110-111 and non-text region 108; and page-image 106 contains text region 112.

Figure 2:
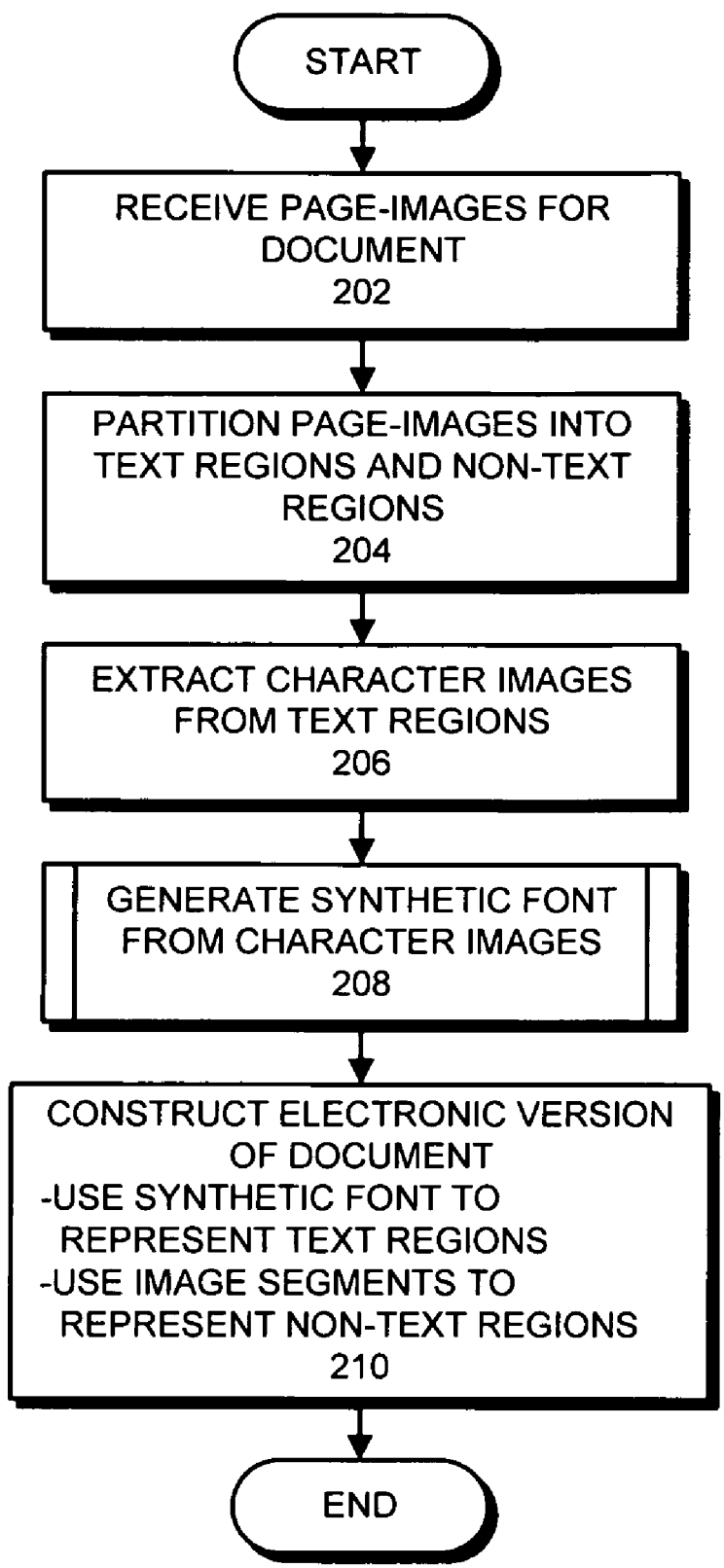
FIG. 2 presents a flow chart of the document imaging process in accordance with an embodiment of the present invention.

During the document imaging process, character images 114 are extracted from the text regions. These character images are analyzed to generate a synthetic font 116. This synthetic font 116 is then used to represent text regions 109-112 from page-images 104-106, thereby forming corresponding "converted" text regions 128-131 in the "imaged" document, which comprises page-images 124-126. Note that image-segments from non-text regions 107-108 are simply transferred without significant modification from page-images 104-105 to corresponding page-images 124-125. This process is described in more detail below with reference to the flow chart in FIG. 2.

First, the system receives page-images for the document (step 202). Note that these page-images, which are also referred to as "scanned images," can be created using a scanner, copier, camera, or other imaging device. Next, the system partitions the page-images into text regions and non-text regions (step 204). There exist a number of well-known techniques to differentiate text regions from non-text regions, so this step will not be discussed further.

The system subsequently extracts character images from the text regions (step 206). (This is a well-known process, which is widely used in OCR systems.) The system then generates a synthetic font from the character images, through a process which is described in more detail below with reference to FIGS. 3 and 4 (step 208).

Finally, the system constructs the new electronic version of the document. This involves using the synthetic font to precisely duplicate the text regions of the document, and using image-segments extracted from the pages-images to represent non-text regions of the document (step 210).

Note that OCR errors that arise during this process will have the same effect as they do in searchable image formats. That is, the glyph will appear as the noise-reduced scanned glyph, but that glyph will be mislabeled. For example, an "I" might be mislabeled as a "1". In this case, viewers will see the scanned "I" but a search for an ASCII "I" will not find the "I".

Synthetic Font Creation

Figure 3:
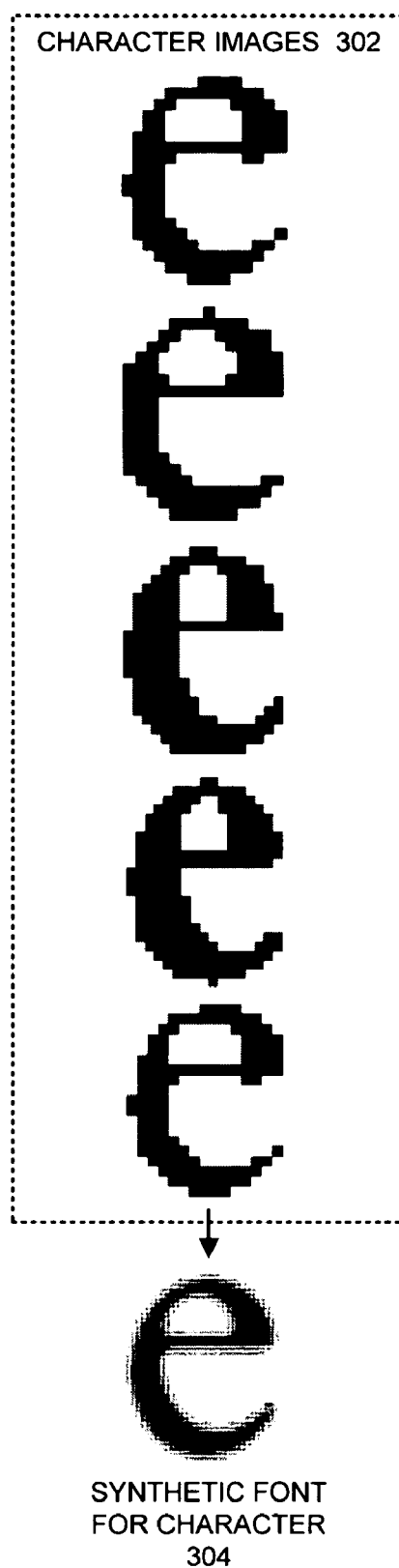
FIG. 3 illustrates how a synthetic font is created from character images in accordance with an embodiment of the present invention.

FIG. 3 illustrates how a synthetic font is created from character images in accordance with an embodiment of the present invention. This iterative process involves classifying the character images into clusters containing similar character images (character images that are instances of the same glyph image). The character images 302 in a given cluster are then combined using statistical techniques to form a glyph in a synthetic font 304 for the character. Although the character images 302 have a significant amount of noise from the scanning process, the statistical techniques can significantly reduce this noise to produce a relatively clean synthetic font 304.

Figure 4:
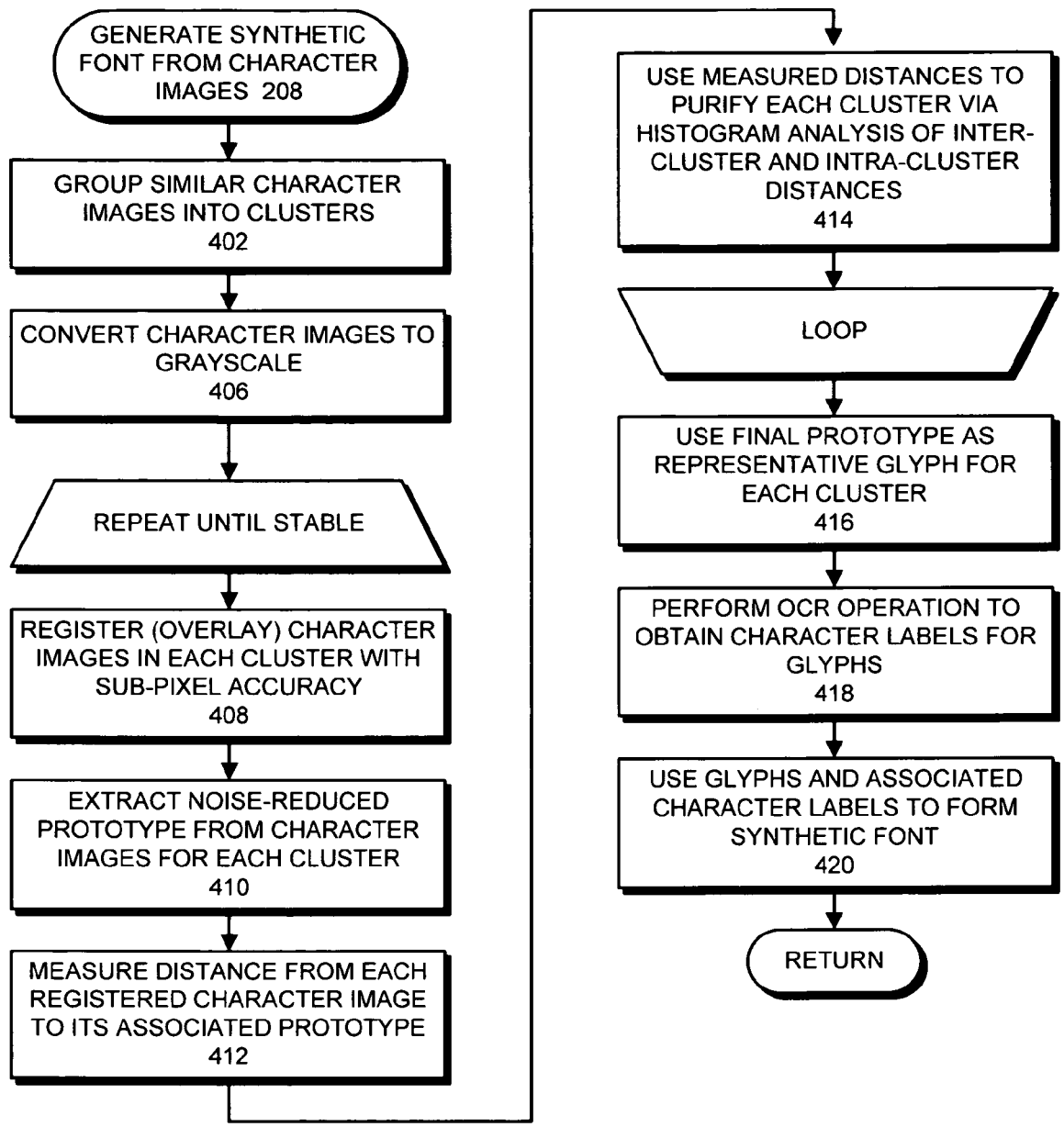
FIG. 4 presents a flow chart illustrating how a synthetic font is generated in accordance with an embodiment of the present invention.

FIG. 4 presents a flow chart illustrating how a synthetic font is generated from character images in accordance with an embodiment of the present invention. First, the system groups similar character images into clusters (step 402). Next, the system converts the character images to grayscale, which can involve using any one of a number of different conversion techniques (step 406).

The system then performs an iterative process, which involves the following steps. First, the system overlays the character images in each cluster with sub-pixel accuracy (step 408). Note that this involves registering the character images with each other at a resolution finer than a pixel. There are a number of ways to do this, such as up-sampling the pixels so that each pixel becomes 4 or 16 pixels. In one embodiment of the present invention, sub-pixel registration is accomplished by calculating the area of pixel overlap as a floating point number. Thus, each input pixel contributes a fraction of blackness to a number of composite pixels, proportional to the precise amount of overlap with those pixels. The effective target resolution is much higher than could be practically achieve by allocating a hi-res buffer for the whole glyph. This technique is described in more detail in the description of FIGS. 5A and 5B.

Next, the system extracts a noise-reduced prototype from the character images for each cluster (step 410). The system then measures the distance from each registered character image to its associated prototype (step 412). Then, the system uses the measured distances to purify each cluster through a histogram analysis of inter-cluster and intra-cluster distances (step 414). This iterative process is repeated until the clusters are stable.

Note that any one of a number of well-known distance metrics (from various pattern-recognition techniques) can be used to measure the distance between a given registered character image and its corresponding prototype. For example, the system can perform an exclusive-OR operation between the character image and the prototype, and can count the number of bits that differ between them. Of course, other, more-sophisticated distance metrics can be used instead of a simple bit difference. Ideally, the distance metric correlates with perceived visual difference.

The histogram analysis generally ranks the character images by distance from the prototype. If necessary, the clusters are "purified" by removing character images that are a large distance from the prototype. These removed character images can then be re-clustered, so that they fall into different and/or new clusters.

Next, the system uses the final prototype for each cluster as the representative glyph for the cluster (step 416). In one embodiment of the present invention, the system also performs a standard OCR operation on each representative glyph to obtain character labels for each representative glyph (step 418). Note that if this OCR operation is not accurate, it is possible for a glyph to be associated with an erroneous character label. Hence, if possible, it is desirable to perform a manual correction on these character label assignments. If it is not possible to correct character assignment, the representative glyph will still provide an accurate visual representation of the character, even if the assigned character label is not accurate.

Finally, the representative glyphs and associated character labels are used to form the synthetic font (step 420). Note that synthetic fonts may have multiple glyphs for each "character" to preserve the perceptually lossless property.

High-Resolution Grid

Figure 5A:
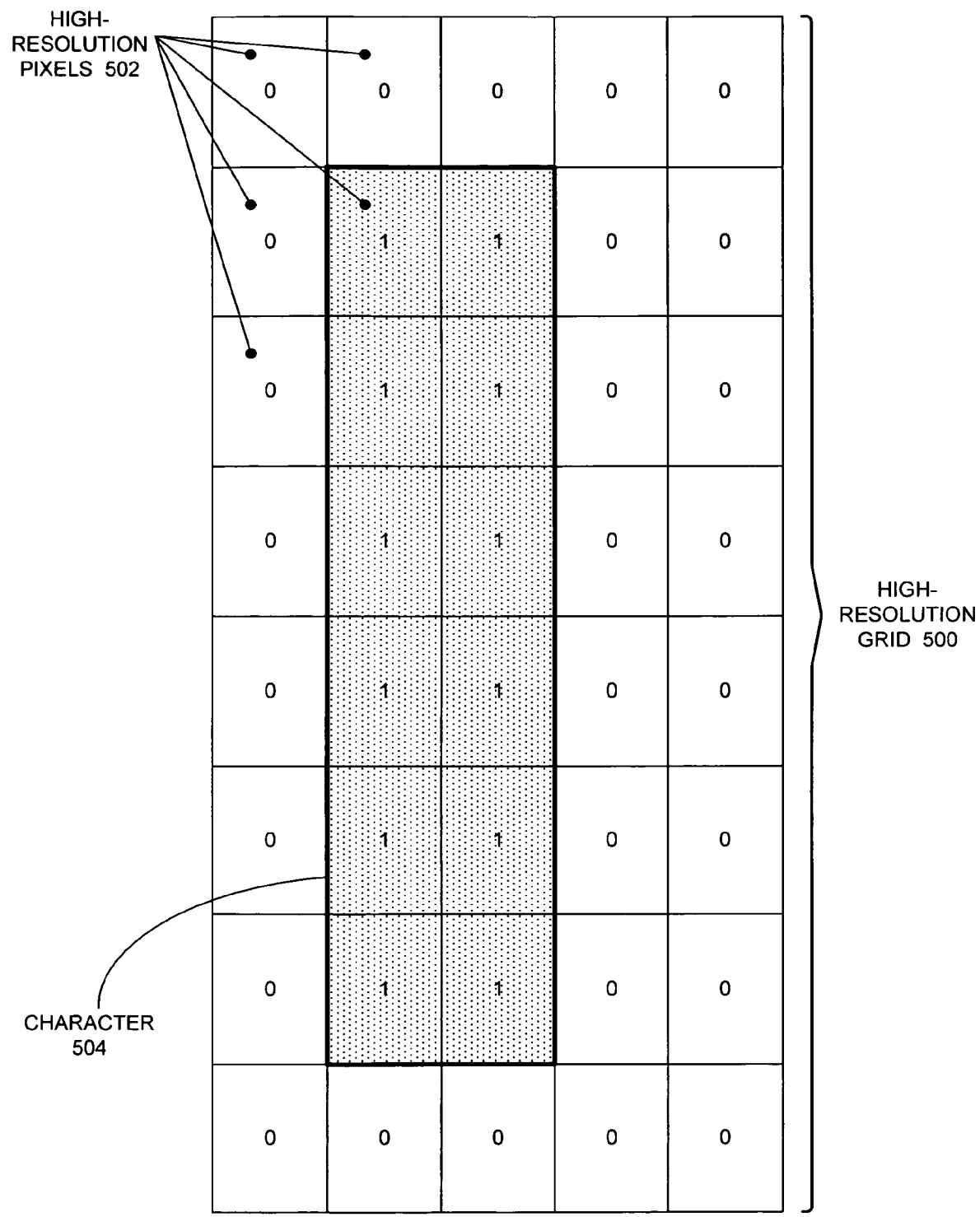
FIG. 5A illustrates a high-resolution grid in accordance with an embodiment of the present invention.
Figure 5B:
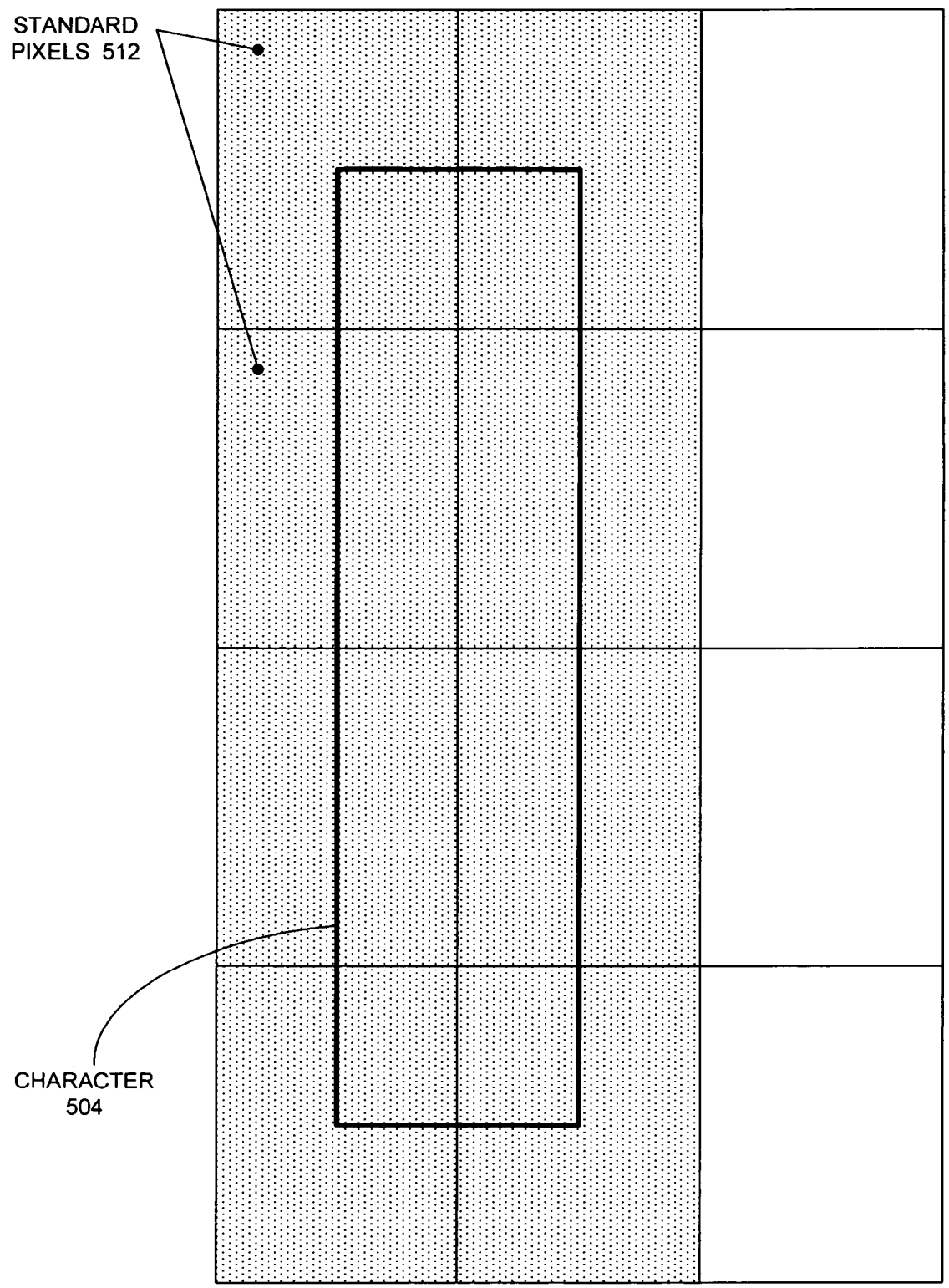
FIG. 5B illustrates a standard-resolution grid in accordance with an embodiment of the present invention.
Figure 5C:
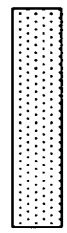
FIG. 5C illustrates resultant characters in accordance with an embodiment of the present invention.
Figure 5C:
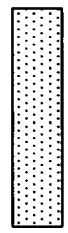
Figure 5C:
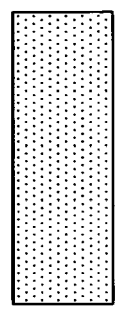

FIG. 5A illustrates a high-resolution grid 500 in accordance with an embodiment of the present invention. FIG. 5B illustrates a standard-resolution grid 510 in accordance with an embodiment of the present invention. FIG. 5C illustrates resultant characters in accordance with an embodiment of the present invention. High-resolution grid 500 is used in the creation of the synthetic font described previously. In one embodiment of the present invention, a capital letter "I", represented by character 504, is placed on top of high-resolution grid 500. The amount of black over each high-resolution pixel 502 is represented by a filled box.

In a traditional system where some arbitrary threshold is selected when converting from grayscale to monochrome, character 504, as depicted in FIG. 5B, would end up either too skinny or too wide. Note that in the example illustrated in FIG. 5B, character 504 is the width of one standard pixels 512 and the height of three standard pixels 512. However, the resulting monochrome character from standard-resolution grid 510 would be two standard pixels 512 wide and four standard pixels 512 high, as illustrated by resulting monochrome character from standard-resolution grid 524 in FIG. 5C.

In one embodiment of the present invention, this limitation can be overcome by increasing the resolution of the analysis grid, as illustrated by high-resolution grid 500 (which increases the resolution of the resulting composite font). For example, the high-resolution pixels 502 that are covered by character 504 are set to black, represented by the "1". In contrast, the high-resolution pixels 502 that are not covered are set to white, represented by "0". The resulting character is represented by resulting monochrome character from high-resolution grid 522 in FIG. 5C.

In one embodiment of the present invention, the process described above is performed with a stack of multiple instances of the same glyph image that have been aligned. Note that any type of sub-pixel alignment may be used. In one embodiment of the present invention, the multiple instances of the same glyph image are centroid aligned.

In one embodiment of the present invention, the original glyph images are converted to higher spatial and tonal resolution to allow small-angle rotations and sub-pixel translations. The resulting high resolution glyph images are precisely aligned and overlaid so that the entire cluster is arranged in one large stack. Precise alignment is achieved by searching iteratively for the relative rotation and x-y translation that maximizes the area of overlap of the two high resolution glyph images. Because of the precise alignment, nuances of glyph shape are reinforced while random variations are averaged out making the stack itself a very accurate representation of the original generating glyph.

The aligned stack of multiple instances of the same glyph image is placed over the high-resolution grid 500, and the blackness values above each high-resolution pixel 502 are averaged. For example, if the multiple instances of the same glyph image is comprised of 4 characters, and only three of the four characters cover a particular high-resolution pixel 502, then that particular high-resolution pixel 502 would be set to seventy-five percent black. When the final monochrome character is created from the high-resolution grid 500, the blackness of the final monochrome character is set to the same value as the average blackness for stack of multiple instances of the same glyph image. In this manner, the final result is a monochrome character that is a close representation of the original character. In addition, the averaging helps to remove noise from the imaging process described previously.

In another embodiment of the present invention, each high-resolution pixel 502 counts the number of layers that are black in the area directly above that particular high-resolution pixel 502 (ie, each high-resolution pixel 502 represents a histogram of the layers of glyph images above high-resolution grid 500). The counts are then scaled from zero to 255 to represent grey values for the resulting grayscale character, which can then be converted to monochrome using the afore-mentioned threshold process, resulting in a monochrome character with a total blackness equal to the average blackness of the glyph images in the stack of multiple instances of the same glyph image. Because noise introduced during an imaging process is unlikely to be present at the same location in each glyph image, that noise is likely to be represented by a very light gray color in the resulting grayscale character. When the threshold process is applied to the resulting grayscale character during the conversion to a monochrome character, the light gray color representing the noise will likely be converted to a white pixel, thus being eliminated from the resulting monochrome character.

In one embodiment of the present invention, the system can also perform a blur operation on the edges of character 504 to create a grey ramp on either side of character 504. This up-sampling and blurring facilitates a cleaner outline of the resulting monochrome character. At this point, the system can determine a threshold where the total blackness of the resulting monochrome character is the same blackness as character 504.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   performing by a computer:
      receiving a plurality of glyph images, wherein a glyph image specifies a characteristic shape of a character in a font, and wherein each glyph image in the plurality of glyph images is a separate instance of the same glyph image;
      determining an average blackness for the plurality of glyph images, wherein the blackness of a given glyph image is the number of black pixels in the given glyph image;
      creating a composite grayscale glyph image from the plurality of glyph images; and
      creating a monochrome glyph image from the composite grayscale glyph image, wherein the monochrome glyph image has the same blackness as the average blackness of the plurality of glyph images.

2. The method of claim 1, wherein creating the composite grayscale glyph image involves:
   stacking each glyph image in the plurality of glyph images to create a stack of glyph images, and in doing so, using sub-pixel alignment to align each glyph image to glyph images that are already present in the stack of glyph images;
   overlaying the stack of glyph images on an analysis grid; and
   for each pixel in the analysis grid,
      determining an average position blackness for an associated position in the stack of glyph images that is directly above a pixel in the high resolution grid, and
      assigning the average position blackness to the pixel in the high resolution grid, thereby creating the composite grayscale glyph image.

3. The method of claim 2, wherein creating the monochrome glyph image involves:
   determining a blackness threshold for a total blackness of the composite grayscale glyph image; and
   for each pixel on the analysis grid,
      if the average position blackness is at or above the blackness threshold, setting the pixel's value to black, and
      if the average position blackness is below the blackness threshold, setting the pixel's value to white.

4. The method of claim 3, wherein prior to determining the blackness threshold, the method further comprises:
   increasing the resolution of the composite grayscale glyph image; and
   performing a blurring operation on the increased resolution composite grayscale glyph image.

5. The method of claim 2, wherein aligning each glyph image involves:
   performing a centroid alignment, wherein the centroid is the center of mass of the glyph image; or
   performing an offset-centroid alignment, wherein an offset is added to the centroid to determine the alignment of the glyph image.

6. The method of claim 2, wherein the analysis grid has a pixel resolution greater than each glyph image in the stack of glyph images.

7. The method of claim 1, further comprising reducing the resolution of the monochrome glyph image to match the resolution of the plurality of glyph images.

8. A computer-readable storage medium storing instructions that when executed by a computer cause the computer to perform a method comprising:
   receiving a plurality of glyph images, wherein a glyph image specifies a characteristic shape of a character in a font, and wherein each glyph image in the plurality of glyph images is a separate instance of the same glyph image;
   determining an average blackness for the plurality of glyph images, wherein the blackness of a given glyph image is the number of black pixels in the given glyph image;
   creating a composite grayscale glyph image from the plurality of glyph images; and
   creating a monochrome glyph image from the composite grayscale glyph image, wherein the monochrome glyph image has the same blackness as the average blackness of the plurality of glyph images.

9. The computer-readable storage medium of claim 8, wherein creating the composite grayscale glyph image involves:
   stacking each glyph image in the plurality of glyph images to create a stack of glyph images, and in doing so, using sub-pixel alignment to align each glyph image to glyph images that are already present in the stack of glyph images;
   overlaying the stack of glyph images on an analysis grid; and
   for each pixel in the analysis grid,
      determining an average position blackness for an associated position in the stack of glyph images that is directly above a pixel in the high resolution grid, and assigning the average position blackness to the pixel in the high resolution grid, thereby creating the composite grayscale glyph image.

10. The computer-readable storage medium of claim 9, wherein creating the monochrome glyph image involves:
   determining a blackness threshold for a total blackness of the composite grayscale glyph image; and
   for each pixel on the analysis grid,
      if the average position blackness is at or above the blackness threshold, setting the pixel's value to black and
      if the average position blackness is below the blackness threshold, setting the pixel's value to white.

11. The computer-readable storage medium of claim 10, wherein prior to determining the blackness threshold, the method further comprises:
   increasing the resolution of the composite grayscale glyph image; and
   performing a blurring operation on the increased resolution composite grayscale glyph image.

12. The computer-readable storage medium of claim 9, wherein aligning each glyph image involves:
   performing a centroid alignment, wherein the centroid is the center of mass of the glyph image; or
   performing an offset-centroid alignment, wherein an offset is added to the centroid to determine the alignment of the glyph image.

13. The computer-readable storage medium of claim 9, wherein the analysis grid has a pixel resolution greater than each glyph image in the stack of glyph images.

14. The computer-readable storage medium of claim 8, wherein the method further comprises reducing the resolution of the monochrome glyph image to match the resolution of the plurality of glyph images.

15. An apparatus, comprising:
   a receiving mechanism configured to receive a plurality of glyph images, wherein a glyph image specifies a characteristic shape of a character in a font, and wherein each glyph image in the plurality of glyph images is a separate instance of the same glyph image;
   a determination mechanism configured to determine an average blackness for the plurality of glyph images, wherein the blackness of a given glyph image is the number of black pixels in the given glyph image;
   a composite-font-creation mechanism configured to create a composite grayscale glyph image from the plurality of glyph images; and
   a monochrome-font-creation mechanism configured to create a monochrome glyph image from the composite grayscale glyph image, wherein the monochrome glyph image has the same blackness as the average blackness of the plurality of glyph images.

16. The apparatus of claim 15, wherein the composite-font-creation mechanism is configured to:
   stack each glyph image in the plurality of glyph images to create a stack of glyph images, and in doing so, using sub-pixel alignment to align each glyph image to glyph images that are already present in the stack of glyph images;
   overlay the stack of glyph images on an analysis grid; and
   for each pixel in the analysis grid, to
      determine an average position blackness for an associated position in the stack of glyph images that is directly above a pixel in the high resolution grid, and to
      assign the average position blackness to the pixel in the high resolution grid, thereby creating the composite grayscale glyph image.

17. The apparatus of claim 16, wherein the monochrome-font-creation mechanism is configured to:
   determine a blackness threshold for a total blackness of the composite grayscale glyph image; and
   for each pixel on the analysis grid,
      if the average position blackness is at or above the blackness threshold, set the pixel's value to black, and
      if the average position blackness is below the blackness threshold, set the pixel's value to white.

18. The apparatus of claim 17, wherein the determination mechanism is further configured to:
   increase the resolution of the composite grayscale glyph image; and
   perform a blurring operation on the increased resolution composite grayscale glyph image prior to determining the blackness threshold.

19. The apparatus of claim 16, wherein aligning each glyph image involves:
   performing a centroid alignment, wherein the centroid is the center of mass of the glyph image; or
   performing an offset-centroid alignment, wherein an offset is added to the centroid to determine the alignment of the glyph image.

20. The apparatus of claim 16, wherein the analysis grid has a pixel resolution greater than each glyph image in the stack of glyph images.

* * * * *